Aug. 27, 1963 J. B. COOK ETAL 3,102,160

TELEPHONE CABLE CONSTRUCTION

Filed Dec. 22, 1961

*INVENTORS.*
JOHN B. COOK
*BY* WILLIAM T. FRASER

BLAIR & BUCKLES.

ATTORNEYS.

3,102,160
Patented Aug. 27, 1963

3,102,160
TELEPHONE CABLE CONSTRUCTION

John B. Cook, Hamden, and William T. Fraser, Woodbridge, Conn., assignors to The Whitney Blake Company, New Haven, Conn.

Filed Dec. 22, 1961, Ser. No. 161,595
7 Claims. (Cl. 174—105)

Figure 1:
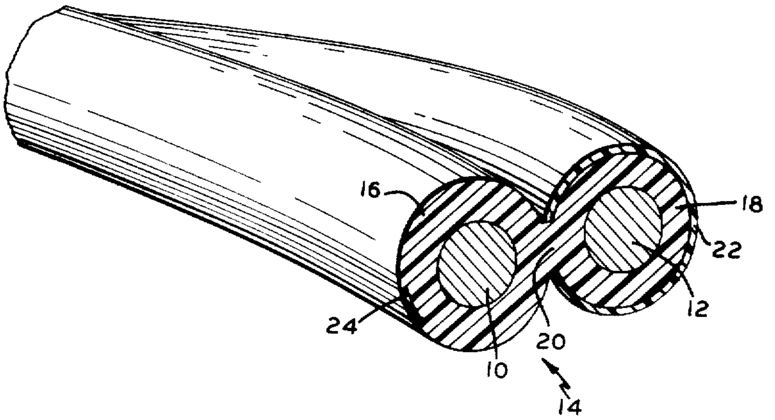

This invention relates to improvements in telephone cable construction and is a continuation-in-part of application Serial No. 841,482, filed September 22, 1959, now abandoned. The invention more particularly relates to joined pairs of insulated telephone conductors having a particular type of insulation covering and to a cable construction utilizing such novel insulated conductors. More specifically, the invention pertains to a pair of wires conjointly covered with polyethylene or like insulating material, joined together with suitable surface covering, and to a cable construction having incorporated therein such joined pairs in a manner to be described to achieve certain important advantages in telephone cable construction.

Modern telephone cable construction as used on a mass scale in large centers of population, in long lines between cities and in a variety of other applications, comprises an assembly of pairs of wires bundled together in a predetermined configuration and enclosed in suitable protective jacketing. The individual pairs in such telephone cables will, in many instances, run into the hundreds and must be, so to speak, electrically independent, for many such pairs at a particular instant may each be connected to telephone instruments at widely scattered points and must carry electrical signal currents necessary for the transmission of the human voice or other signals through each pair. This must be done through each pair without receiving interference from other pairs or wires in the cable, and in turn without producing any interference with the similar operation of other pairs in the cable. According to well-established procedures now in use in telephone cable construction, the individual pairs of wires are not only twisted about each other but also cabled in groups in a predetermined pattern to inhibit greatly, if not completely eliminate, cross talk which results from induction between two or more pairs of wires running parallel to each other in a cable. The present telephone cable construction now in wide use comprises a mass of individual conductors electrically insulated by polyethylene covering and color coded so that they may be identified as individual pairs for purposes of connection. The individual pairs of such conductors are cabled together in a certain pattern to eliminate any parallelism betwen adjacent individual pairs of conductors.

More particularly, the pairs in a telephone cable have different twists or, more specifically, different "lays." A "lay" comprises the length or distance over which two wires are twisted about each other through 360 degrees. By twisting these pairs with different lays, i.e. by employing different lengths for a complete 360 degree twist of adjacent pairs, the pattern of the entire mass of pairs of conductors is such that they are constantly crossing each other, thereby avoiding parallelism with its resultant adverse effects.

A problem arises in assembling cable with conventional, individually twisted, conductor pairs when the cable units or groups of pairs are twisted in a reverse direction, as compared to the pair twist. With the pairs having a left-hand twist, the application of a right-hand twist to the cable unit would result in opening of the conductor pair twist in a non-uniform way so that cross talk and parallelism would be reintroduced into the assembly. Furthermore, with conventional cable having even a dozen different twist lays in a six-inch length, the assembled unit becomes a great series of knuckles pushed against each other in which the outside or overriding wire tends to be more or less transverse to the axis of the cable because the angle of twist of the lay is added to the angle of twist of the unit.

In use, these telephone cables, which generally comprise masses of pairs of conductors, must be spliced in the field. This involves identifying accurately each individual pair and connecting it with its corresponding mate in another cable. To do this, both ends of the cables to be connected must be stripped back to identify the individual pairs. Some times as much as a foot or more must be stripped so that the longest lay can be identified. To cut waste by such stripping, the industry has employed short twist lays for each pair of wires and a twist lay of 6 inches or 8 inches has become maximum industry practice. Unfortunately, however, where the cable contains a large number of wires, practical difficulties arise due to the 6 inch to 8 inch lay length limit because of the overriding cross talk requirement. To meet these difficulties, one school of cable manufacturers uses 12 different twist lays with a minimum of 10 percent difference in lays between each pair Another school utilizes 25 different twist lay with 5 percent difference in twist between each pair. But since twist machinery is generally not high precision equipment, the maintenance of such 5 percent or 10 percent differences is not consistently possible. Nonuniformities in the wire hardness create a tendency for the twist to move forward or backward when assembled in a cable. Such pushback or pushforward of twist is further enhanced during seating of the wires in the cable forming process because the two wires of the pair are not fixed together. The wires are easy to displace because of the very low coefficient of friction of the thermoplastic covering of the wires. Furthermore, since the two separate wires of the pair have been wrapped around each other in the twisting operation just prior to the cable forming process, they tend to recover somewhat from such deformation, so that their position is not a firm and stabilized structure. Even a slight pushback of 1/16 inch in the 5 percent difference embodiment would give a pair with 1½ inch twist a parallelism to the next 5 percent step. Thus, cross talk between these pairs of conductors frequently occurs in a cable with maximum lay of 6 or 8 inches.

Still other problems arise in the twisting of wire. During the manufacture of the conductors, according to modern practice, thermoplastic insulating coatings are extruded continuously on wire passing through extruding apparatus. Further, the individual conductors must be continuously twisted into pairs for cabling into groups of pairs properly fashioned to provide the above-mentioned different "lays" in completed cable construction. In the present stage of the art, it is impossible to twist separate conductors so precisely that each forms around the other in an identical helix of identical length. In other words, twisting equipment does not exist which will twist identical lengths of two conductors so precisely that an appreciable length will not need to be cut off one conductor when the first runs out. One wire always tends to spiral to some slight extent around the other which tends to be straighter, and therefore, shorter. Electrically, this is a major reason for the imperfection of cables made with separate wires. This makes for resistance unbalance and for capacitance unbalance and accounts for most of the noise heard over cable. Also, the manufacturing steps of twisting separate wires necessarily involve the placing of a certain amount of tension on the individual conductors which are usually made of soft copper. This often results in what is known at "draw-down," leading to a relative reduction in the diameter of one conductor. Any such diameter reduction in individual conductors leads to resistance unbalance between conductors which is undesirable. The ideal in telephone cabling is an extremely low pair-to-pair capacitance unbalance and uniform resistivity between the individual conductors. In the unitary pair structure of the invention, the twist is automatically substantially perfect because tension is applied to the whole so one wire cannot be pulled more than the other.

As noted, present telephone cable construction comprises pairs of conductors, each having a smooth insulating cover, usually formed from a thermoplastic such as polyethylene. When such conductors are packed into cable jacketing, very little air or gas space remains in the completed cable. For several reasons, this is undesirable, and in this respect old cable construction utilizing paper-insulated conductors was superior. Thermoplastic-insulated conductors are, however, widely used in telephone cable construction because of the other important advantages they possess. It would be desirable to provide conductors having the advantages of thermoplastic insulation while capable of incorporating substantial amounts of air or gas space within the completed cable, but no successful embodiment of this has thus far been accomplished.

Connecting all of the individual pairs of two cables in the field is a time-consuming job involving proper identification of all pairs after stripping back, substantial lengths of the cable covering and, after identification, doing the necessary splicing and manually reassembling the connected ends. To assist in identification of all pairs, different coloring is frequently employed in the insulation. Unforunately, where coloring matter is added to the full depth of the layer of thermoplastic material forming the insulating covering of each wire, it has been found that different colors may introduce substantially different dielectric characteristics, leading to capacitance differences between pairs of conductors of different colors.

One of the objects of this invention is to provide a pair of connected insulated wires or conductors for use in communication signaling cables, such as telephone cables, and capable of improving the electrical characteristics of such cables.

Another object of this invention is to provide an insulated pair of wires of the above character which reduces cable manufacturing problems and is, therefore, responsible for achieving certain important economies in manufacture.

Another object of this invention is to provide a pair of insulated wires of the above character which is capable of markedly reducing any variation in capacitance between the wires of such pairs when incorporated in telephone cable construction.

Another object is to provide a cable containing a plurality of twisted pairs, each of which has substantial twist uniformity so that ideal minimum differences in twist lay can be employed while optimum cross talk characteristics are maintained.

Another object is to provide cable wherein left-hand and right-hand twist lays may be employed without loss of twist accuracy and afford minimum resistance to the shielding and sheathing operation.

Another object of this invention is to produce a pair of connected insulated wires of the above character which, when incorporated in a telephone cable construction, makes for easy identification of individual pairs, thereby reducing the cost and time of cable installation.

Another object of this invention is to provide a telephone cable construction wherein the pairs of conductors may be easily identified for purposes of connection by stripping back the ends for a very short length of cable even if a rigid and "springy" insulating material is used.

Another object of the invention is to provide a telephone cable construction of the above character wherein the twist lays are long and there is little crossover interference from adjacent twists tending to deform even a soft, porous insulation.

Other objects will in part be obvious and in part pointed out hereinafter.

Figure 2:
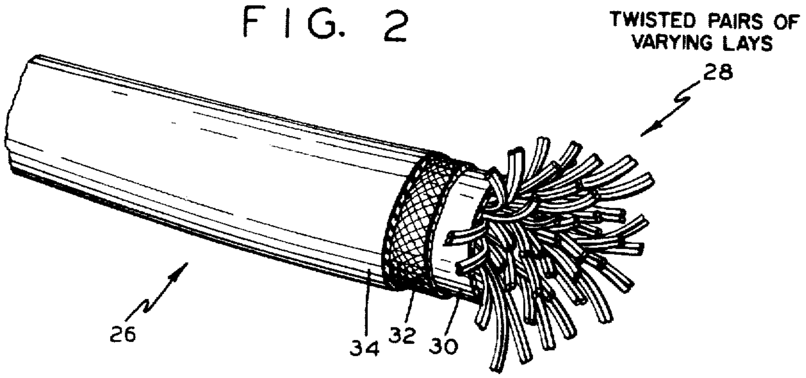

In the accompanying drawing in which is shown one of the various embodiments of this invention:

FIGURE 1 is a greatly enlarged end perspective view of a pair of insulated conductors having the features of the present invention incorporated therein and especially useful when used in telephone cable construction, and FIGURE 2 is an end perspective view of a representative telephone cable construction having the pairs of conductors shown in FIGURE 1 encased therein and stripped back for purposes of identification and splicing.

Similar reference characters refer to similar parts throughout the several views of the drawing.

The invention accordingly comprises an article of manufacture, possessing certain features and properties, and to a construction having combinations of elements and arrangements of parts, all of which will be exemplified in the construction hereinafter set forth, and the scope of the invention will be indicated in the claims.

Referring now to FIGURE 1, wires 10 and 12 are preferably soft copper wire of standard construction such as is used in telephone cabling. For example, wires 10 and 12 may be #22 gauge, or of that general order of size. Surrounding wires 10 and 12 is insulation generally indicated at 14, preferably formed from a thermoplastic material such as polyethylene which may be extruded thereon in a well-known manner. More particularly, the insulation 14 includes generally circular sections 16 and 18 covering wires 10 and 12, respectively. The central interior portion of the insulation 14 between the wires 10 and 12 is a web 20 integral with sections 16 and 18, thereby providing a solid connection therebetween. The width of web 20 is here shown small, although it may be of any convenient width or thickness, according to the particular characteristics of the telephone cable in which the pair of wires 10 and 12 is to be incorporated, thus permitting preselected inclusion of air or gas as a dielectric in the cable.

The two conductors are integrally insulated in roughly a figure 8 shape with materials of two or more identifying colors. Coatings and/or stripes may be used to cover a portion or all of the insulation 14, and these may be in different colors to provide color codings facilitating pair identification in the resulting cable construction. Thus, as shown in FIGURE 1, a thin coating 22 substantially covers the surface of section 18 and desirably this coating is of a different color than the surface of section 16. If desired, a thin stripe may be applied to one or both of the coatings 16 and 18 such as the stripe 24 in section 16, and this again may have a different color characteristic to facilitate identification. These thin coatings and stripes may be extruded. Accordingly, it will be seen that the integral insulation 14 covering the wires 10 and 12 may have a uniform coating, may have an additional coating such as coating 22 applied to one of its sections, or may have a stripe coating 24 applied to one or both sections. These combinations of coating, stripes, and colors may be varied and suited to the particular identification system used in the telephone cabling for which these connected pairs of wires are fabricated. A great number of identifying combinations are made possible by the colors and their configuration.

The conjointly insulated and color coded pairs result in substantial economies in connecting cables. For splicing, a minimum of jacket and sheathing may be stripped to provide the requisite positive identification of conductors. Thus each individual conductor can readily be identified as well as pairs of conductors in the cable. Waste of cable material is minimized, and the laborious task of conductor identification is greatly simplified in connecting cables made in accordance with the invention.

Turning now to FIG. 2, there is shown a representative telephone cable construction generally indicated at 26 including pairs of wires generally indicated at 28 and a suitable protective jacket including an insulating casing 30, and a metallic shield 32, all enclosed in an outside jacket 34 of standard construction. The pairs of wires 28 enclosed in the cable 26 are constructed as shown in FIGURE 1. It is contemplated that the pairs of wires 28 include web connections between the wires of each pair, such as web 20 (FIGURE 1), and that the individual pairs will be colored by suitable coatings and/or stripes such as the coating 22 and stripe 24, all as desired for the particular pattern of cable construction. The pairs 28 are individually twisted in different "lays" in a well-known manner as described above, whereby inductive and capacitive coupling therebetween is minimized.

With the webbed arrangement, as shown, the unitary structure permits twist lays greater than the standard 6 to 8 inches. Since there is no possibility of the twist moving backwards or forwards when assembled in the cable, and since there is adequate separation between the differing twist lays, it is possible to use lays having only slight differences in length. For example, 100 different twist lays may be employed in a 100 pair cable. Even with slight differences in lay length between different pairs, the steps in lay are secured because of the joined insulation of each twisted pair. Thus, ideal minimum differences in twist lay can be maintained.

It will now be seen that the insulated pairs of wires described with reference to FIGURE 1 and the telephone cable construction shown in FIGURE 2 are well suited to overcome prior difficulties and improve upon present telephone cable construction. For purposes of connecting the ends of two cables, it is merely necessary to strip back a very short length of the casing jacket, to expose the connected pairs which may be readily identified because they remain as pairs and do not spring apart during stripping. During the extruding and twisting operations in the manufacture of the conductors and the cabling of the various pairs of wires in a desired pattern, the necessary accompanying tension is resisted by two connected wires instead of one and this largely eliminates problems incident to "draw-down" as previously described. Because the pairs of wires may be easily identified in short lengths, it is possible to use mechanical connectors in the field and also to apply mechanical connectors during manufacture, thus largely eliminating the time and expense now consumed in these cable connecting operations.

It should also be noted that the insulating cover may be simultaneously extruded on both wires of a pair, thus providing an integral coating over both wires with the same dielectric characteristics. Furthermore, the wires are equally spaced throughout the length of the pairs providing for equal and uniformly low electrical capacitance therebetween, and providing a perfect twist in which the lengths of each lay are identical, an advantage minimizing resistance unbalance and pair-to-pair capacitance unbalance. The color surfacing may also be extruded in thin layers either over the surface of one of the wires or in stripes or combinations of these. These thin coatings may be extruded, and this thin coating does not affect the dielectric characteristics of the insulating material forming the cover for the wire. Further, due to the irregular shape of the surface of the combined pairs and the use of long lays, considerable space remains between the pairs in the assembled cable which may receive air or inert gas with resultant advantages. It has been found that the effective separation is greater by more than the combined insulation thickness by reason of twisting.

The conjointly insulated pairs also permit the use of reverse twists of the pairs and cable units. The pairs, for example, may have a left-hand twist while the cable units and core may have a right-hand twist. In prior art cables such a reverse twist configuration loosens the structure and widens the range of capacitance unbalance as the pairs tend to untwist in assembling the cable. At points of crossover of several pairs, these "knuckles" so formed push against other conductors, distorting insulation and changing dielectric characteristics in the cable. The invention makes possible longer lays and results in fewer knuckles per unit length of cable. Any knuckles that do form tend to be parallel to the cable axis and are less subject to pressure from the cable shield and jacket. With the reduction of such pressures in the cable, more delicate insulation, such as expanded polyethylene or polypropylene, may be practically used.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

We claim:

1. A communication cable comprising in combination an outer moisture-impervious jacket, an intermediate shield, and an inner plurality of electrical conductors conjointly insulated in pairs so that longitudinal stresses will be shared equally by the conductors of each pair, said paired conductors being twisted with lengths of lay different from integral multiples of the lengths of lay of other paired conductors within the cable to minimize electrical coupling between paired conductors, the twist lay utilizing identical lengths of wire in each pair to minimize resistance unbalance and pair-to-pair capacitance unbalance, the insulation on said paired conductors comprising flexible dielectric material having two or more identifying colors on each pair of conductors so that both a conductor pair and each conductor of the pair are identifiable relative to the other conductor pairs in said cable by stripping a relatively short length of said jacket from said cable.

2. An electrical cable comprising in combination an outer moisture-impervious jacket, an intermediate shield, and an inner plurality of insulated electrical conductors conjoined in pairs so that longitudinal stresses will be shared equally by the conductors of each pair, each pair of conductors being twisted together in a first direction with a lay length different from the lay lengths of other pairs in said cable, and said twisted paired conductors being twisted together in a second direction, said conductors being insulated from each other and from all other pairs by flexible insulation, said insulation comprising insulating material of a first color substantially surrounding both conductors of a pair with a further thin layer of at least one other color visible on the outer surface of said insulation material, whereby both a conductor pair and each conductor of the pair are readily identifiable by stripping a relatively short length of said jacket from said cable.

3. A communication signalling cable comprising, in combination, a jacket of tough, moisture-impervious, plastic material, an intermediate metallic shield, and an inner plurality of conjointly insulated pairs of electrical conductors, whereby longitudinal stresses will be shared equally by the conductors of each pair, the conductors of each of said pairs being twisted to provide lays of varying lengths to reduce electrical coupling between said pairs of conductors, said conductors being insulated from each other and from all other pairs by plastic insulation of identifying colors on each pair, said insulation comprising insulating material of a first color substantially surrounding both conductors of a pair with a thin layer of at least one other color embedded in the outer portion of said insulation material, whereby a conductor pair and each conductor of the pair is readily identifiable by stripping only a relatively small amount of said jacket from said cable.

4. A communication signaling cable comprising, in combination, a jacket of tough, moisture-impervious, plastic material, an intermediate metallic shield, and an inner plurality of conjointly insulated pairs of electrical conductors, whereby longitudinal stresses will be shared equally by the conductors of each pair, the conductors of each of said pairs being twisted to provide lays of varying lengths between each pair to reduce mutual capacitance therebetween, said conductors being insulated from each other and from all other pairs by plastic insulation of identifying colors on each pair, said insulation comprising insulating material of a first color substantially surrounding both conductors of said pairs with a thin layer of a second and a third color on the outer portion of said insulation material, whereby a conductor pair and each conductor of the pair is readily identifiable by stripping only a relatively small amount of said jacket from said cable.

5. A communication signalling cable comprising, in combination, a jacket of tough, moisture-impervious, plastic material, an intermediate metallic shield, and an inner plurality of conjointly insulated pairs of electrical conductors, whereby longitudinal stresses will be shared equally by the conductors of each pair, the conductors of each of said pairs being twisted to provide lays of varying lengths between each pair to reduce mutual capacitance therebetween, said conductors being insulated from each other and from all other pairs by plastic insulation of identifying colors on each pair, said insulation comprising insulating material of a first color substantially surrounding both conductors of a pair, a strip of insulation of a second color embedded in the surface of said insulating material surrounding one conductor and a covering of a third color surrounding said insulating material of the other conductor, whereby a conductor pair and each conductor of the pair is readily identifiable by stripping only a relatively small amount of said jacket from said cable.

6. A communication signaling cable comprising, in combination, a jacket of tough, moisture-impervious plastic material, an intermediate metallic shield, and an inner plurality of conjointly insulated pairs of electrical conductors, whereby longitudinal stresses will be shared equally by the conductors of each pair, the conjoint insulation of each pair having a substantially circular cross-sectional configuration about each conductor with an integral web therebetween, the conductors of each of said pairs being twisted to provide lays of varying lengths between each pair to reduce electrical coupling between said pairs, said conductors being insulated from each other and from all other pairs by plastic insulation of identifying colors on each pair, said insulation comprising insulating material of a first color substantially surrounding both conductors of a pair, a strip of insulation of a second color embedded in the surface of said insulating material surrounding one conductor and a covering of a third color surrounding said insulating material of the other conductor, whereby a conductor pair and each conductor of the pair is readily identifiable by stripping only a relatively small amount of said jacket from said cable.

7. A communication signaling cable comprising, in combination, a jacket of tough, moisture-impervious, plastic material, an intermediate metallic shield, and an inner plurality of conjointly insulated pairs of electrical conductors, whereby longitudinal stresses will be shared equally by the conductors of each pair, the conjoint insulation of each pair having a substantially circular cross-sectional configuration about each conductor with a relatively thin integral web therebetween, the conductors of each of said pairs being twisted to provide lays of varying lengths between each pair to reduce electrical coupling between said pairs, said conductors being insulated from each other and from all other pairs by plastic insulation of identifying colors on each pair, said insulation comprising insulating material of a first color substantially surrounding both conductors of a pair, a strip of insulation of a second color embedded in the surface of said insulating material surrounding one conductor and a covering of a third color surrounding said insulating material of the other conductor, whereby a conductor pair and each conductor of the pair is readily identifiable by stripping only a relatively small amount of said jacket from said cable.

References Cited in the file of this patent

UNITED STATES PATENTS 1,008,423 McIntyre -------------- Nov. 14, 1911

UNITED STATES PATENT OFFICE
CERTIFICATE OF CORRECTION

Patent No. 3,102,160 August 27, 1963

John B. Cook et al.

It is hereby certified that error appears in the above numbered patent requiring correction and that the said Letters Patent should read as corrected below.

Column 1, line 36, for "or" read -- of --; column 2, line 72, for "at" read -- as --.

Signed and sealed this 3rd day of March 1964.

(SEAL)
Attest:
ERNEST W. SWIDER

Attesting Officer

EDWIN L. REYNOLDS

Acting Commissioner of Patents

UNITED STATES PATENT OFFICE

CERTIFICATE OF CORRECTION

Patent No. 3,102,160 August 27, 1963

John B. Cook et al.

It is hereby certified that error appears in the above numbered patent requiring correction and that the said Letters Patent should read as corrected below.

Column 1, line 36, for "or" read -- of --; column 2, line 72, for "at" read -- as --.

Signed and sealed this 3rd day of March 1964.

(SEAL)
Attest:

ERNEST W. SWIDER

Attesting Officer

EDWIN L. REYNOLDS

Acting Commissioner of Patents